United States Patent
Schlipf et al.

(10) Patent No.: US 12,391,361 B2
(45) Date of Patent: Aug. 19, 2025

(54) WING FOR AN AIRCRAFT

(71) Applicant: Airbus Operations GmbH, Hamburg (DE)

(72) Inventors: Bernhard Schlipf, Hamburg (DE); Christoph Winkelmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/588,545

(22) Filed: Feb. 27, 2024

(65) Prior Publication Data
US 2024/0286732 A1    Aug. 29, 2024

(30) Foreign Application Priority Data
Feb. 28, 2023    (EP) ..................................... 23159092

(51) Int. Cl.
*B64C 9/20*    (2006.01)
(52) U.S. Cl.
CPC ..................................... *B64C 9/20* (2013.01)
(58) Field of Classification Search
CPC ................................... B64C 9/20; B64C 9/18
See application file for complete search history.

(56) References Cited

U.S. PATENT DOCUMENTS

| | | | | |
|---|---|---|---|---|
| 1,917,428 A * | 7/1933 | Burnelli | ..................... | B64C 9/28 244/214 |
| 2,404,895 A | 7/1946 | Zap | | |
| 3,785,594 A * | 1/1974 | Lee | ........................... | B64C 9/16 244/216 |
| 4,471,928 A | 9/1984 | Cole | | |
| 4,725,026 A * | 2/1988 | Krafka | ...................... | B64C 9/16 244/215 |
| 9,545,992 B2 * | 1/2017 | Guering | .................... | B64C 9/16 |
| 11,820,512 B2 * | 11/2023 | Huber | ....................... | B64C 3/50 |
| 2015/0090843 A1 | 4/2015 | Guering | | |
| 2024/0253768 A1 * | 8/2024 | Lorenz | ...................... | B64C 9/34 |

FOREIGN PATENT DOCUMENTS

WO    2018197649 A1    11/2018

OTHER PUBLICATIONS

Extended Search report for EP23159092.8, dated Aug. 14, 2023, 8 pages.

* cited by examiner

*Primary Examiner* — Brian M O'Hara
(74) *Attorney, Agent, or Firm* — Nixon & Vanderhye P.C.

(57) ABSTRACT

A wing for an aircraft is disclosed including a main wing and a trailing edge high lift assembly having a flap, and a connection assembly movably connecting the flap to the main wing, such that the flap is movable between a retracted position and at least one extended position, wherein the connection assembly includes a support element that is mounted to the flap and that is movably mounted to the main wing, such that the support element is movable relative to the main wing along a predefined path between a stowed position and a deployed position. The support element is formed as an elongate support beam that extends along a beam longitudinal axis between a front end and a rear end and has an intermediate portion between the front and rear ends.

15 Claims, 6 Drawing Sheets

WING FOR AN AIRCRAFT

CROSS REFERENCE TO RELATED APPLICATION

This application claims priority to and incorporates by reference the entirety of European Patent Application EP 23159092.8, filed Feb. 28, 2023.

TECHNICAL FIELD

The present disclosure relates to a wing for an aircraft. Further aspects of the disclosure relate to a trailing edge high lift assembly as used in such a wing, as well as an aircraft comprising such a wing and/or such a trailing edge high lift assembly.

The wing comprises a main wing and a trailing edge high lift assembly. The trailing edge high lift assembly comprises a flap and a connection assembly movably connecting the flap to the main wing, preferably to the trailing edge of the main wing, such that the flap is movable between a retracted position and at least one extended position. The connection assembly comprises a support element that is mounted to the flap, preferably fixedly mounted to the flap, and that is movably mounted to the main wing, such that the support element is movable relative to the main wing along a predefined path between a stowed position, when the flap is in the retracted position, and a deployed position, when the flap is in the at least one extended position.

Similar wings are known in the art. Some known wings employ a support element in the form of a carriage rolling or sliding along a rail attached to the trailing edge of the main wing. The flap is mounted to the carriage either directly or by a linkage, so that the flap can be moved between the retracted position and the extended position when the carriage runs along the rail. The rail, however, extends outside of the main wing contour and requires a fairing.

Another known wing has a support element in the form of a rotating arm that is rotatably mounted to the main wing at one end and mounted to the flap at the opposite end. This rotating arm is mounted to a rib of the main wing outside the main wing contour and therefore also requires a fairing.

SUMMARY

The present disclosure contemplates providing a wing that does not require a fairing or which requires a fairing with a minimum size only, to reduce drag of the wing.

The present disclosure contemplates a support element being formed as an elongate support beam that extends along a beam longitudinal axis, which may be curved or straight, between a front end and a rear end and has an intermediate portion between the front and rear ends. The rear end and/or the intermediate portion of the support beam is mounted to the flap, preferably fixedly mounted to the flap. The front end and/or the intermediate portion of the support beam are mounted to the main wing by a guide bearing, preferably a roller bearing and/or a slide bearing, such that the support beam is movable relative to the guide bearing along the predefined path along the beam longitudinal axis, i.e. in extension of the beam longitudinal axis, between the stowed position and the deployed position. In such a way, a fairing can be avoided or at least minimized, so that drag of the wing can be essentially reduced.

According to an exemplary embodiment, the guide bearing comprises a roller bearing including at least a first roller unit mounted to the main wing, preferably fixedly mounted to the main wing, and engaging an engagement surface at the intermediate portion and/or at the front end of the support beam. The first roller unit has a rotation axis preferably in parallel to span direction and/or to the trailing edge of main wing and/or to a hinge axis of the flap around which the flap rotates when moved between the retracted and extended positions. Such a roller bearing allows a very efficient and reliable guiding of the support beam.

In particular, the roller bearing may comprise a second roller unit mounted to the main wing, preferably fixedly mounted to the main wing, at a position spaced apart from the first roller unit along the beam longitudinal axis and engaging the engagement surface at the intermediate portion and/or at the front end of the support beam. The second roller unit has a rotation axis preferably in parallel to span direction and/or to the trailing edge of main wing and/or to a hinge axis of the flap around which the flap rotates when moved between the retracted and extended positions. By such two roller units spaced along the beam longitudinal axis a very efficient guide bearing is formed that can receive high loads.

The roller bearing may comprise a third roller unit mounted to the main wing, preferably fixedly mounted to the main wing, and engaging the engagement surface at the intermediate portion and/or at the front end of the support beam at a side of the support beam opposite from the first and second roller units. The roller bearing may comprise a fourth roller unit mounted to the main wing, or may be fixedly mounted to the main wing, at a position spaced apart from the third roller unit along the beam longitudinal axis and engaging the engagement surface at the intermediate portion and/or at the front end of the support beam at a side of the support beam opposite from the first and second roller units. The first and second roller units may engage a top portion of the engagement surface on a top surface of the support beam, and the third and fourth roller units engage a bottom portion of the engagement surface on a bottom surface of the support beam. The third roller unit and/or the fourth roller unit has a rotation axis preferably in parallel to span direction and/or to the trailing edge of main wing and/or to a hinge axis of the flap around which the flap rotates when moved between the retracted and extended positions. By such four roller units spaced along the beam longitudinal axis and engaging the support beam from opposite sides a very efficient guide bearing is formed that can receive high loads.

According to an exemplary embodiment, the support beam has a profile comprising an upper flange portion, a lower flange portion, and at least one web portion connecting upper and lower flange portions. Such a profile might be e.g. a C-profile, a double-C-profile, an I-profile, an H-profile, or a II-profile. By such a profile, a very strong and lightweight beam profile is provided.

The first roller unit and, if present, and also the second roller unit may be arranged in a recess between upper and lower flange portions in a way engaging the engagement surface provided at the upper flange portion and/or at the lower flange portion, either the upper flange portion or the lower flange portion or both flange portions in a successive manner. In such a way, the first roller unit and preferably also the second roller unit do not occupy the space above and below the support beam, and the support beam can be supported with only a minimum of roller elements. This simplifies the connection assembly, saves space and weight, and thus increases efficiency of the wing. In some embodiments there might also be one or more additional roller units engaging the upper surface of the support beam from above.

The support beam may have such a profile, for example, an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses from opposite sides, thereby providing efficient guiding and a reliable hold.

The first roller unit may comprise a first roller element and a second roller element. The first roller element is arranged in the first recess and the second roller element is arranged in the second recess. The first and second roller elements are arranged coaxially and have the same radius. Preferably, the second roller unit comprises a third roller element and a fourth roller element. The third roller element is arranged in the first recess and the fourth roller element is arranged in the second recess. The third and fourth roller elements are arranged coaxially and have the same radius. By such an arrangement, high loads can be absorbed and a symmetric arrangement or an arrangement with two separate main load paths is enabled.

According to an exemplary embodiment, the support beam comprises a first beam part and a second beam part that are formed separate from one another. Each of the first and second beam parts is formed integrally and extends along the beam longitudinal axis from the rear end to the front end. The first and second beam parts are mounted to one another, e.g. by bolts, and rest against one another along a contact plane spanned by the beam longitudinal axis and a wing thickness direction, which might be a vertical symmetry plane, preferably along the entire longitudinal extension. Preferably, the first and second beam parts are formed as two C-profiles resting back-to-back against one another. By the first and second beam parts two individual main load paths are introduced which might be designed as redundant main load paths such that when one main load path fails the other main load path is still capable of carrying the occurring air loads applied via the flap.

According to an exemplary embodiment, the support beam is mounted to the flap by a mounting device. The mounting device comprises a mounting structure, preferably including one or more links, link plates, or beams, fixedly mounted to or formed integrally with the structure of the flap and mounted to the support beam by a first bearing, preferably at the rear end of the support beam, and a second bearing, preferably at the intermediate portion or at the front end of the support beam, spaced from one another along the beam longitudinal axis. Preferably, the first and second bearings include spherical bearings. In case of roller units engaging the support beam from opposite sides, preferably from top and bottom, the mounting structure may preferably comprise a first link and a second link. The first link may be mounted to the rear end of the support beam by a spherical bearing and the second link may be mounted to the front end of the support beam by a spherical bearing. The first link and the second link may be mounted to one another pivotable about an axis extending in a thickness direction of the wing. In case of roller units arranged in a recess between upper and lower flange portions of the support beam, the mounting structure may preferably comprise a link plate, a first link and a second link. The link plate may be mounted to the rear end of the support beam by two spherical bearings spaced along the beam longitudinal axis. The first link is mounted to the link plate by a spherical bearing and is mounted to the second link by a spherical bearing spaced from the link plate. The second link is mounted to the intermediate portion of the support beam by a spherical bearing spaced from the first link. The first link is mounted to the structure of the flap, preferably fixedly mounted to or formed integrally with the structure of the flap. In such a way, efficient mounting can be realized where constraint forces can be avoided.

According to an exemplary embodiment, the connection assembly comprises an actuation unit mounted to the main wing, preferably fixedly mounted to the main wing, and coupled to the flap or to the support element for actuating the flap for movement between the retracted position and the extended position. In such a way, a simple actuation of the flap is enabled.

The actuation unit may comprise a ball screw actuator comprising a nut with an internal thread and a rotatably driven shaft with an external thread engaging the internal thread of the nut. Preferably, the shaft is mounted to the main wing in a rotatably driven way, and the nut is mounted directly or indirectly to the support beam or to the flap. Preferably the nut is formed as a sleeve covering the thread of the shaft in the retracted position of the flap. Additionally or alternatively, the actuation unit comprises a rotary actuator comprising a rotatably driven arm, preferably mounted at the main wing and coupled to the support beam or to the flap via a linkage including at least one link or drive strut. In such a way, very simple, reliable and efficient actuation units can be employed.

According to an exemplary embodiment, the connection assembly comprises a closing panel covering the support beam from below with respect to the external flow. Preferably, the closing panel is pivotably mounted to the main wing, preferably to the lower side of the main wing aft of a rear spar, and is mounted to the support beam, preferably fixedly mounted to the support beam, preferably directly or indirectly, e.g. via the mounting device, so that the closing panel pivots between a closed position, where it forms an extension of and/or extends aligned with a lower main wing panel, and an opened position, where it extends angled with respect to the lower main wing panel, when the support beam is moved between the stowed position and the deployed position. The closing panel might be mounted to the support beam e.g. by a) via a link coupling the closing panel to the mounting device or to the actuator or flap; b) via a cam track on the closing panel interacting with a pin on the mounting device or on the actuator or on the flap; c) via a pin on the closing panel interacting with a cam track on the mounting device or on the actuator or on the flap; d) via a spring-loaded closing panel pushed open by extending the mounting device on respective contact surfaces on the closing panel. By such a closing panel, a smooth air flow along the lower side of the wing is enhanced, thereby reducing drag.

A further aspect of the present disclosure relates to a trailing edge high lift assembly for the wing according to any of the embodiments described above. The trailing edge high lift assembly comprises a flap, and a connection assembly configured for movably connecting the flap to the main wing, such that the flap is movable between a retracted position and at least one extended position. The connection assembly comprises a support element that is mounted to the flap and that is configured for being movably mounted to the main wing, such that the support element is movable relative to the main wing along a predefined path between a stowed position and a deployed position. The support element is formed as an elongate support beam that extends along a beam longitudinal axis between a front end and a rear end and has an intermediate portion between the front and rear ends. The rear end and/or the intermediate portion of the support beam is mounted to the flap. The front end and/or the intermediate portion of the support beam are configured to be mounted to the main wing by a guide bearing, such that the support beam is movable along the predefined path along the beam longitudinal axis between the stowed position and the deployed position. The features and advantages mentioned in connection with the wing also apply for the trailing edge high lift assembly.

A further aspect of the present disclosure relates to an aircraft comprising the wing according to any of the embodiments described above and/or comprising the trailing edge high lift assembly according to any of the embodiments described above. The features and advantages mentioned in connection with the wing and the trailing edge high lift assembly also apply for the aircraft.

BRIEF DESCRIPTION OF THE DRAWINGS

Hereinafter, exemplary embodiments of the present disclosure are explained in more detail by means of the following drawing figures.

DETAILED DESCRIPTION

Some embodiments will now be described with reference to the Figures.

Figure 1:
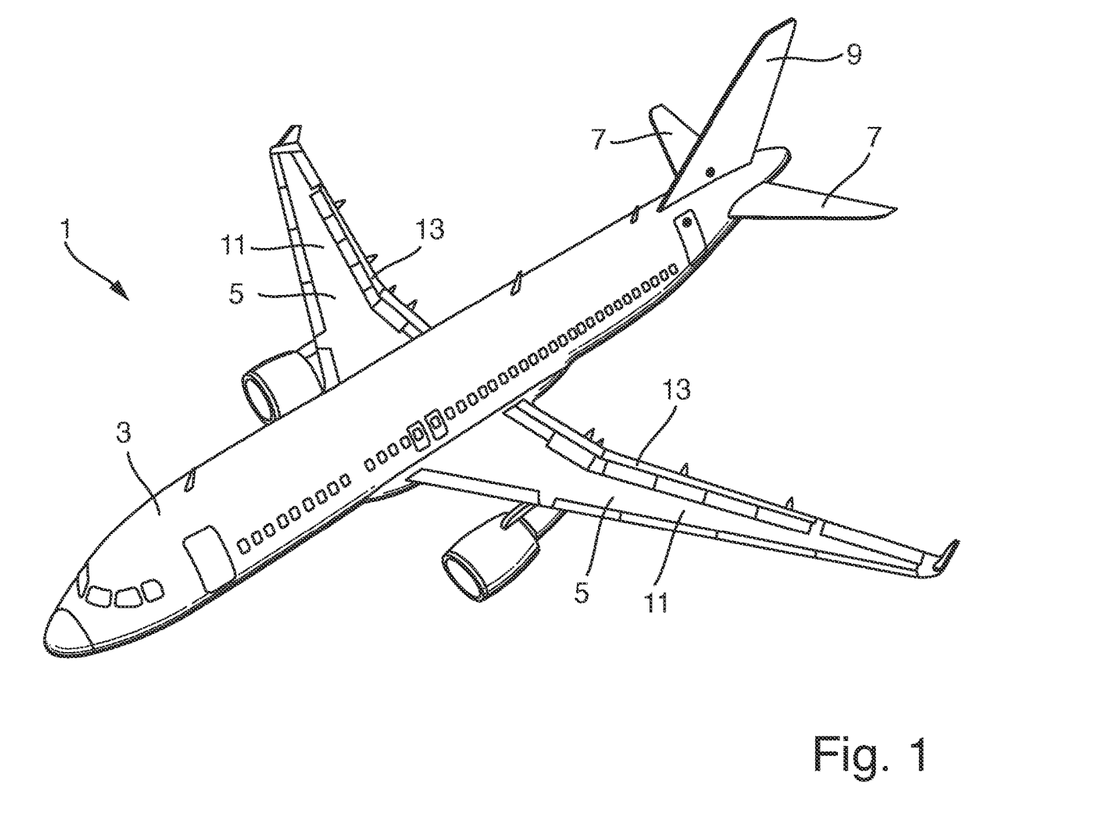
FIG. 1 is a perspective view of an aircraft according to an exemplary.

In FIG. 1 an aircraft 1 according to an embodiment of the present invention is illustrated. The aircraft 1 comprises a fuselage 3, wings 5, a horizontal tail plane 7 and a vertical tail plane 9.

Figure 2:
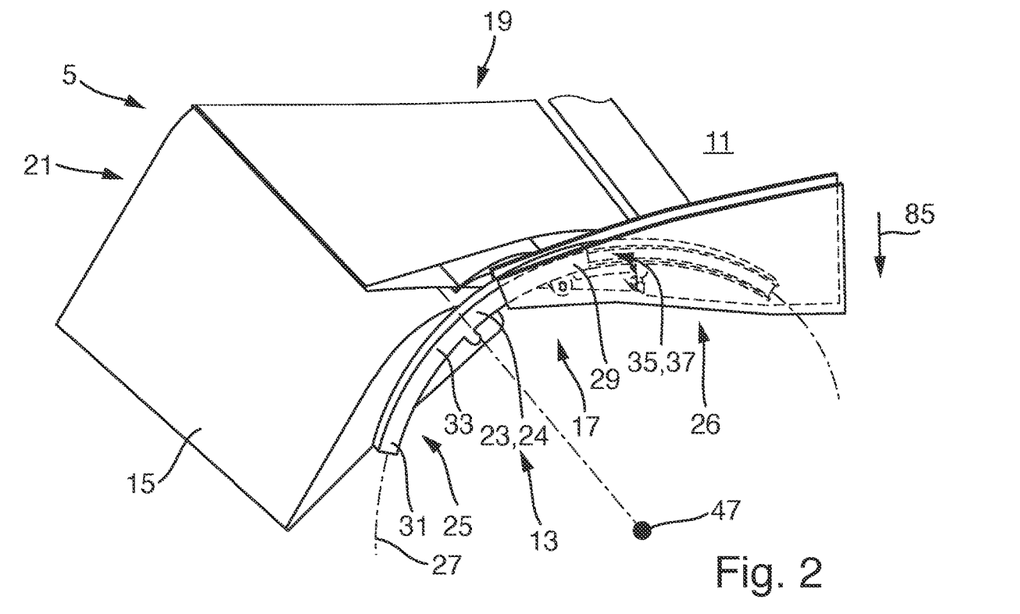
FIG. 2 is a perspective view of the wing shown in FIG. 1 with a focus on the trailing edge high lift assembly according to an exemplary.

FIG. 2 shows one of the wings 5 from FIG. 1 in more detail. The wing 5 comprises a main wing 11 and a trailing edge high lift assembly 13. The trailing edge high lift assembly 13 comprises a flap 15 and a connection assembly 17 movably connecting the flap 15 to the main wing 11, such that the flap 15 is movable between a retracted position 19 and at least one extended position 21. The connection assembly 17 comprises a support element 23 that is fixedly mounted to the flap 15 and that is movably mounted to the main wing 11, such that the support element 23 is movable relative to the main wing 11 along a predefined path between a stowed position 26, when the flap 15 is in the retracted position 19, and a deployed position 25, when the flap 15 is in the at least one extended position 21.

The support element 23 is formed as an elongate support beam 24 that extends along a curved beam longitudinal axis 27 between a front end 29 and a rear end 31 and has an intermediate portion 33 between the front and rear ends 29, 31. The rear end 31 and the intermediate portion 33 of the support beam 24 are fixedly mounted to the flap 15. The front end 29 and the intermediate portion 33 of the support beam 24 are mounted to the main wing 11 by a guide bearing 35 in the form of a roller bearing, such that the support beam 24 is movable relative to the guide bearing 35 along the predefined path along the beam longitudinal axis 27 between the stowed position 26 and the deployed position 25.

Figure 3:
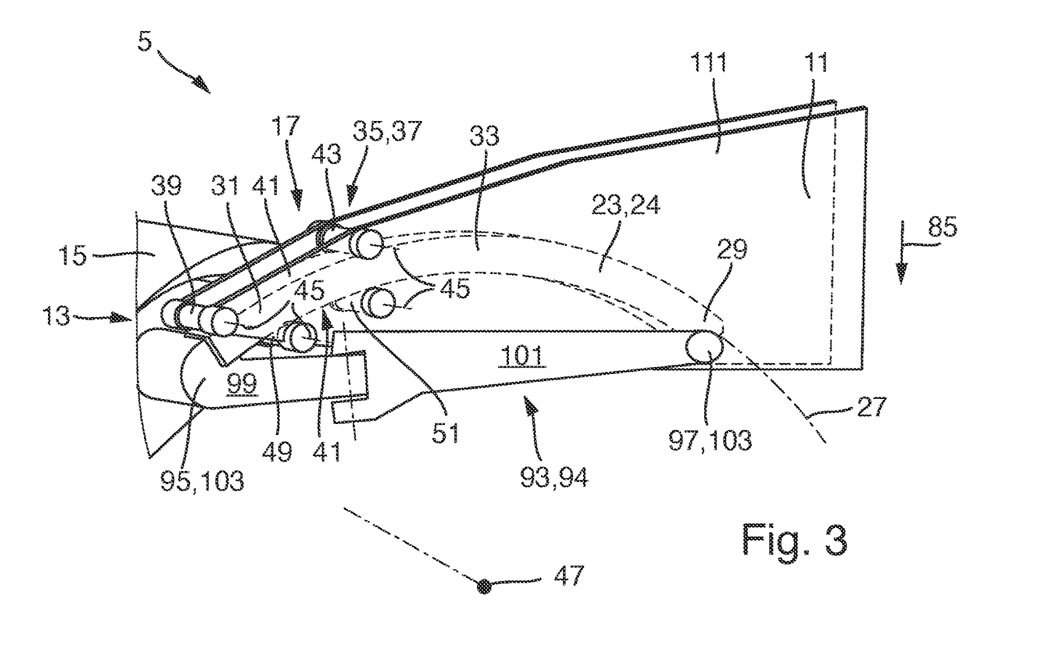
FIG. 3 is a perspective view of an embodiment of the wing where the support beam is engaged by rollers from above and below.
Figure 4:
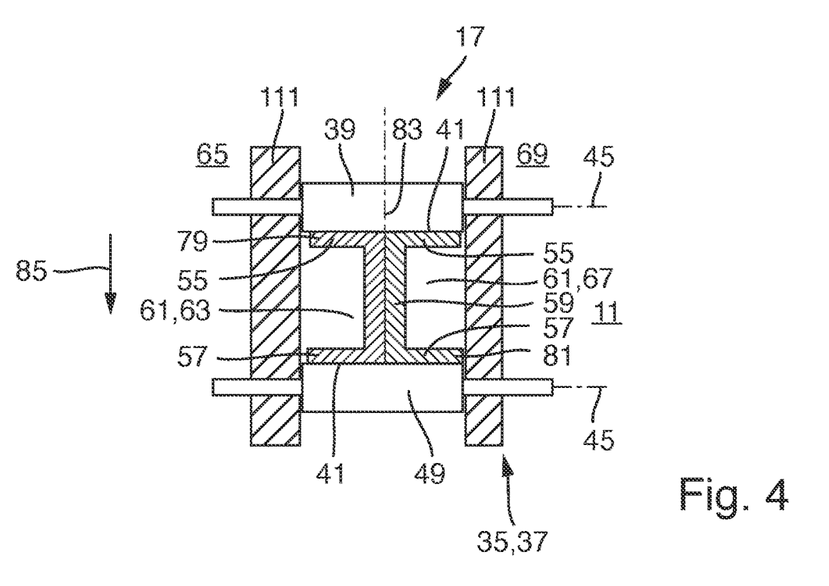
FIG. 4 is a cross sectional view of the connection assembly of the wing shown in FIG. 3.
Figure 5:
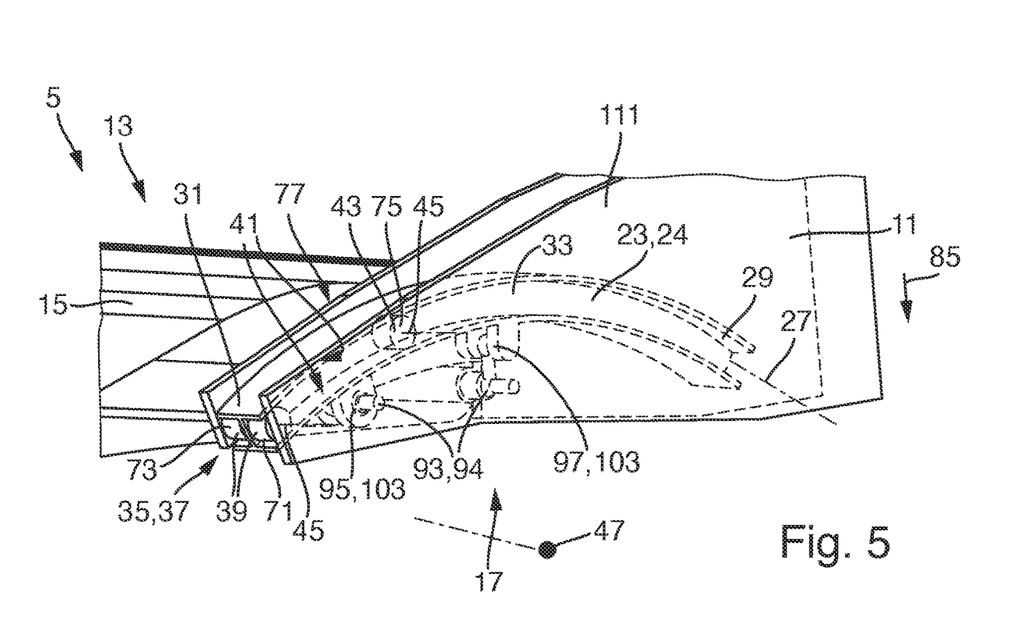
FIG. 5 is a perspective view of an exemplary embodiment of the wing where the support beam is engaged by rollers arranged between upper and lower flanges.
Figure 6:
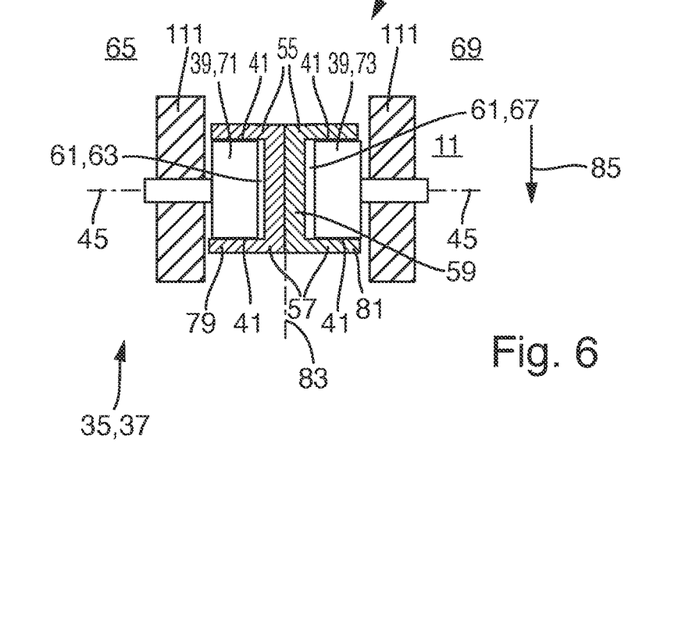
FIG. 6 is a cross sectional view of the connection assembly of the wing shown in FIG. 5.

In the embodiment shown in FIGS. 3 and 4 and in the embodiment shown in FIGS. 5 and 6, two variants of the guide bearing 35 are shown. In both variants the guide bearing 35 comprises a roller bearing 37 including at least a first roller unit 39 mounted to the main wing 11 and engaging an engagement surface 41 at the intermediate portion 33 and at the front end 29 of the support beam 24. Further, the roller bearing 37 comprises a second roller unit 43 mounted to the main wing 11 at a position spaced apart from the first roller unit 39 along the beam longitudinal axis 27 and engaging the engagement surface 41 at the intermediate portion 33 and at the front end 29 of the support beam 24. The first and second roller units 39, 43 have rotation axes 45 in parallel to a hinge axis 47 of the flap 15 around which the flap 15 rotates when moved between the retracted 19 and extended positions 21.

In the embodiment shown in FIGS. 3 and 4, the roller bearing 37 comprises a third roller unit 49 mounted to the main wing 11 and engaging the engagement surface 41 at the intermediate portion 33 and at the front end 29 of the support beam 24 at a side of the support beam 24 opposite from the first and second roller units 39, 43. Further, the roller bearing 37 comprises a fourth roller unit 51 mounted to the main wing 11 at a position spaced apart from the third roller unit 49 along the beam longitudinal axis 27 and engaging the engagement surface 41 at the intermediate portion 33 and at the front end 29 of the support beam 24 at a side of the support beam 24 opposite from the first and second roller units 39, 43. The first and second roller units 39, 43 engage a top portion of the engagement surface 41 on a top surface of the support beam 24, and the third and fourth roller units 49, 51 engage a bottom portion of the engagement surface 41 on a bottom surface of the support beam 24. The third roller unit 49 and the fourth roller unit 51 have rotation axes 45 in parallel to the hinge axis 47 of the flap 15 around which the flap 15 rotates when moved between the retracted and extended positions 19, 21.

As shown in FIGS. 4 and 6, in both embodiments the support beam 24 has a profile comprising an upper flange portion 55, a lower flange portion 57, and a web portion 59 connecting upper and lower flange portions 55, 57, in the present embodiment a double-C-profile.

In the embodiment shown in FIGS. 5 and 6, the first roller unit 39 and the second roller unit 43 is arranged in a recess 61 between upper and lower flange portions 55, 57 in a way engaging the engagement surface 41 provided at the upper flange portion 55 and/or at the lower flange portion 57, specifically either the upper flange portion 55 or the lower flange portion 57 or both flange portions 55, 57 in a successive manner.

The support beam 24 shown in FIG. 6 has such a profile, namely a double-C-profile, that a first recess 61 is formed between the upper and lower flange portions 55, 57 at a first side 65 of the web portion 59, and a second recess 67 is formed between the upper and lower flange portions 55, 57 at a second side 69 of the web portion 59 opposite the first side 65. The first roller unit 39 comprises a first roller element 71 and a second roller element 73. The first roller element 71 is arranged in the first recess 63 and the second roller element 73 is arranged in the second recess 67. The first and second roller elements 71, 73 are arranged coaxially and have the same radius. Further, the second roller unit 43 comprises a third roller element 75 and a fourth roller element 77. The third roller element 75 is arranged in the first recess 63 and the fourth roller element 77 is arranged in the second recess 67. The third and fourth roller elements 75, 77 are arranged coaxially and have the same radius.

As shown in FIGS. 4 and 6, in both embodiments the support beam 24 comprises a first beam part 79 and a second beam part 81 that are formed separate from one another. Each of the first and second beam parts 79, 81 is formed integrally and extends along the beam longitudinal axis 27 from the rear end 31 to the front end 29. The first and second beam parts 79, 81 are mounted to one another, e.g. by bolts, and rest against one another along a contact plane 83 spanned by the beam longitudinal axis 27 and a wing thickness direction 85, which corresponds to a vertical symmetry plane along the entire longitudinal extension of the support element 23. The first and second beam parts 79, 81 are formed as two C-profiles resting back-to-back against one another. The first and second beam parts 79, 81 form two individual main load paths which are designed as redundant main load paths such that when one main load path fails the other main load path is still capable of carrying the occurring air loads applied via the flap 15.

Figure 7:
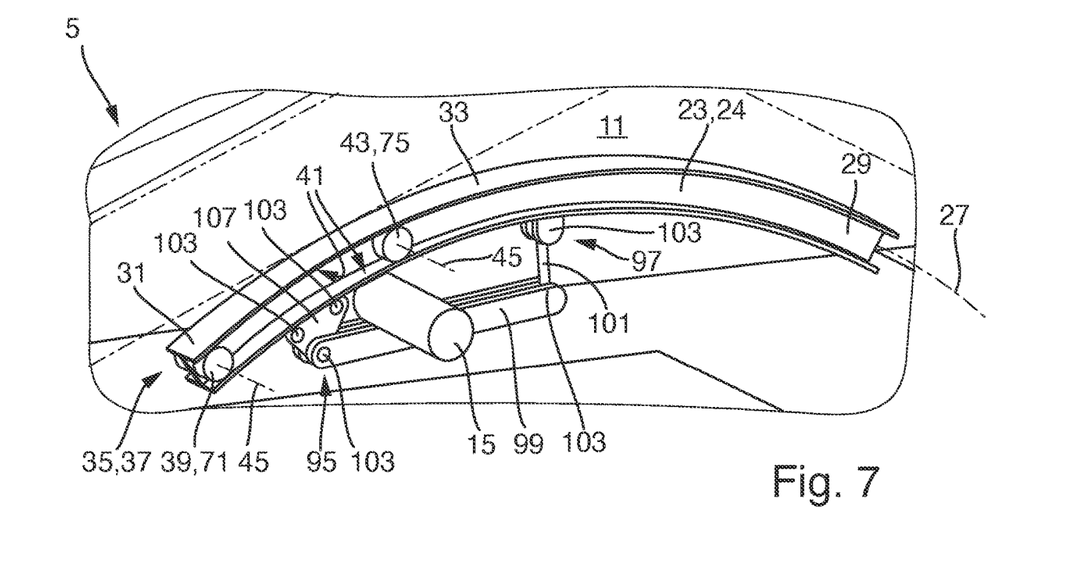
FIG. 7 is a perspective view of an exemplary embodiment of the wing corresponding to the embodiment of FIG. 5 but with a different mounting device.
Figure 8:
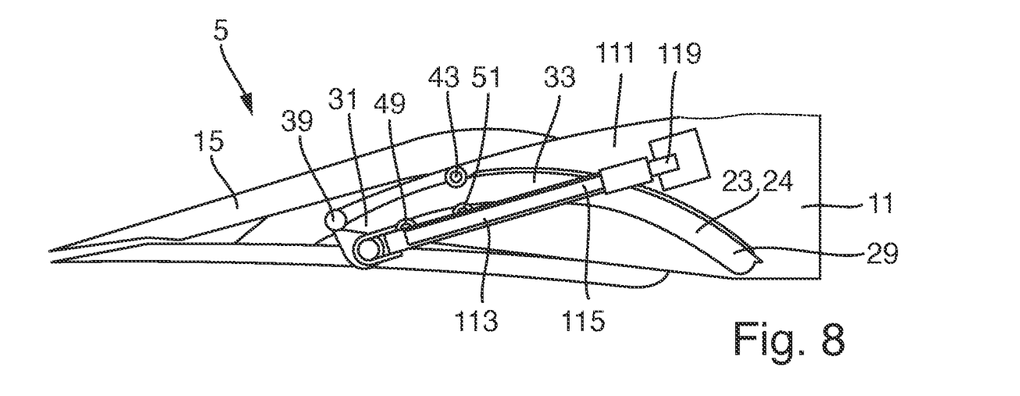
FIG. 8 is a side view of an exemplary embodiment of the wing including an actuation unit.
Figure 9:
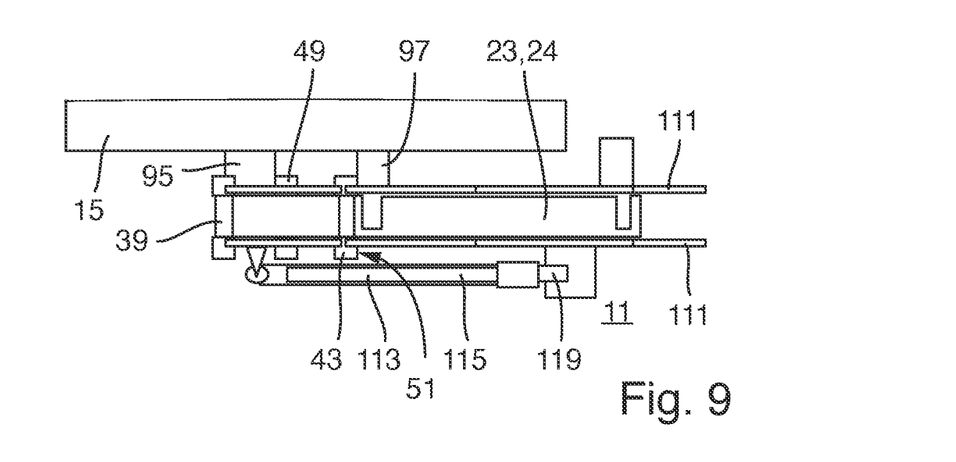
FIG. 9 is a top view of the wing of FIG. 8.

As shown in FIGS. 3, 5 and 7, the support beam 24 is mounted to the flap 15 by a mounting device 93. The mounting device 93 comprises a mounting structure 94 fixedly mounted to or formed integrally with the structure of the flap 15 and mounted to the support beam 24 by a first bearing 95 and a second bearing 97 spaced from one another along the beam longitudinal axis 27. In the embodiment shown in FIG. 3, the mounting structure 94 comprises a first link 99 and a second link 101. The first link 99 is mounted to the rear end 31 of the support beam 24 by a spherical bearing 103 and the second link 101 is mounted to the front end 29 of the support beam 24 by a spherical bearing 103. The first link 99 and the second link 101 are mounted to one another pivotable about an axis extending in the wing thickness direction 85 of the wing 5. In the embodiment shown in FIG. 7, the mounting structure 94 comprises a link plate 107, a first link 99 and a second link 101. The link plate 107 is mounted to the rear end 31 of the support beam 24 by two spherical bearings 103 spaced along the beam longitudinal axis 27. The first link 99 is mounted to the link plate 107 by a spherical bearing 103 and is mounted to the second link 101 by a spherical bearing 103 spaced from the link plate 107. The second link 101 is mounted to the intermediate portion 33 of the support beam 24 by a spherical bearing 103 spaced from the first link 99. The first link 99 is fixedly mounted to or formed integrally with the structure of the flap 15.

As shown in FIGS. 8 to 11, the connection assembly 17 comprises an actuation unit 109 fixedly mounted to a rib 111 of the main wing 11 and coupled to the support element 23 for actuating the flap 15 for movement between the retracted position 19 and the extended position 21. In the illustrated embodiments, the actuation unit 109 comprises a ball screw actuator 113 comprising a nut 115 with an internal thread and a rotatably driven shaft 119 with an external thread engaging the internal thread of the nut 115. The shaft 119 is mounted to the main wing 11 in a rotatably driven way, and the nut 115 is mounted to the support beam 24. The nut 115 is formed as a sleeve covering the thread of the shaft 119 in the retracted position 19 of the flap 15. In other embodiments, the actuation unit 109 might also comprise a rotary actuator (not shown) comprising a rotatably driven arm mounted at the main wing 11 and coupled to the support beam 24 or to the flap 15 via a linkage including at least one link or drive strut.

Figure 10:
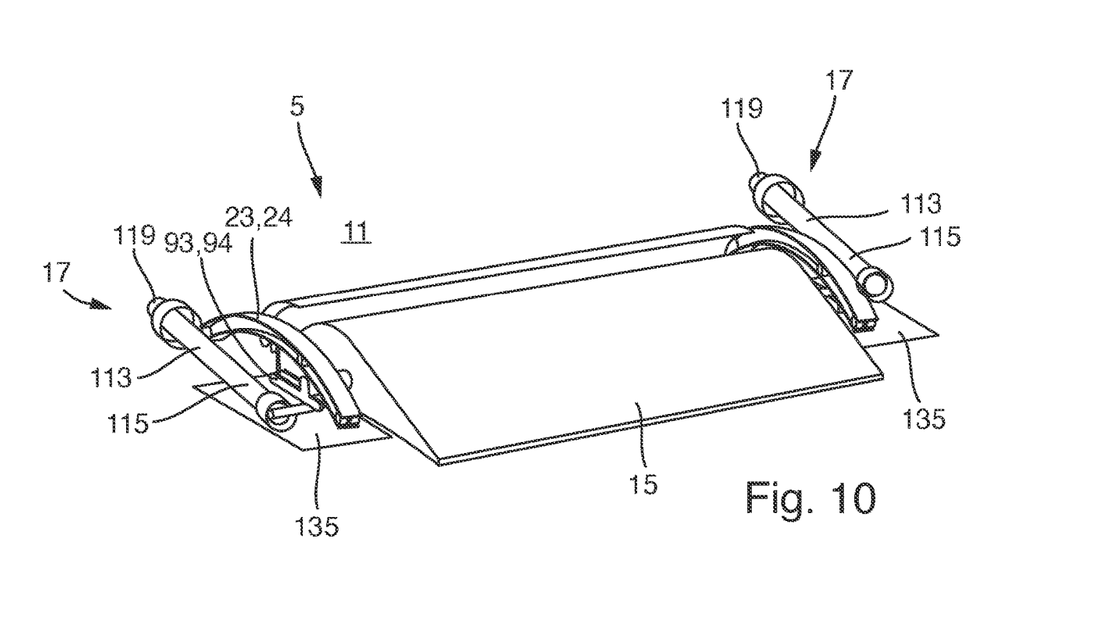
FIG. 10 is a perspective view of an exemplary embodiment of the wing including an actuation unit and a closing plate.
Figure 11:
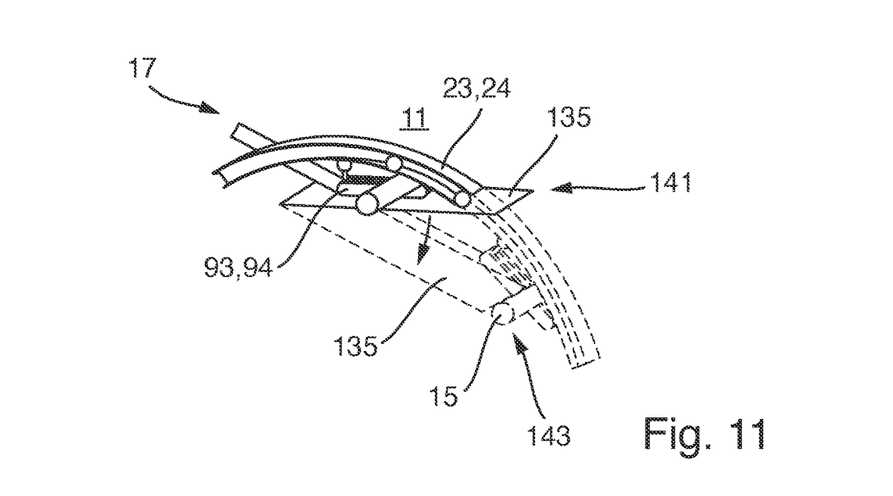
FIG. 11 is a perspective view of the wing of FIG. 10 illustrating the function of the closing panel.

As shown in FIGS. 10 and 11, the connection assembly 17 comprises a closing panel 135 covering the support beam 24 from below with respect to the external flow. The closing panel 135 is pivotably mounted to the lower side of the main wing 11 aft of a rear spar and is mounted to the support beam 24 via the mounting device 93, so that the closing panel 135 pivots between a closed position 141, where it forms an extension of a lower main wing panel, and an opened position 143, where it extends angled with respect to the lower main wing panel, when the support beam 24 is moved between the stowed position 26 and the deployed position 25.

By a wing 5 as described above employing a connection assembly 17 including a guided support beam 24 for movably connecting the flap 15 to the main wing 11, a fairing can be avoided or at least its size can be minimized, so that drag of the wing 5 can be essentially reduced.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing, and
   a trailing edge high lift assembly comprising
   a flap, and
   a connection assembly movably connecting the flap to the main wing, such that the flap is movable between a retracted position and at least one extended position,
   wherein the connection assembly comprises a support element that is mounted to the flap and that is movably mounted to the main wing, such that the support element is movable relative to the main wing along a predefined path between a stowed position and a deployed position,
   wherein the support element is formed as an elongate support beam that extends along a beam longitudinal axis between a front end and a rear end and has an intermediate portion between the front and rear ends,
   the rear end and/or the intermediate portion of the support beam is mounted to the flap,
   the front end and/or the intermediate portion of the support beam are mounted to the main wing by a guide bearing, such that the support beam is movable along the predefined path along the beam longitudinal axis between the stowed position and the deployed position, and wherein the support beam is mounted to the flap by a mounting device comprising a mounting structure including a first link and a second link, wherein the first link is mounted to the rear end or the intermediate portion of the support beam and the flap, wherein the second link is mounted to the front end or the intermediate portion of the support beam and the flap.

2. The wing according to claim 1, wherein the guide bearing comprises a roller bearing including at least a first roller unit mounted to the main wing and engaging an engagement surface at the intermediate portion and/or at the front end of the support beam.

3. The wing according to claim 2, wherein the roller bearing comprises a second roller unit mounted to the main wing at a position spaced apart from the first roller unit along the beam longitudinal axis and engaging the engagement surface at the intermediate portion and/or at the front end of the support beam.

4. The wing according to claim 3, wherein the roller bearing comprises a third roller unit mounted to the main wing and engaging the engagement surface at the intermediate portion and/or at the front end of the support beam at a side of the support beam opposite from the first and second roller units, wherein the roller bearing comprises a fourth roller unit mounted to the main wing at a position spaced apart from the third roller unit along the beam longitudinal axis and engaging the engagement surface at the intermediate portion and/or at the front end of the support beam at a side of the support beam opposite from the first and second roller units, wherein the first and second roller units engage a top portion of the engagement surface on a top surface of the support beam, and the third and fourth roller units engage a bottom portion of the engagement surface on a bottom surface of the support beam.

5. The wing according to claim 1, wherein the support beam has a profile comprising an upper flange portion, a lower flange portion, and at least one web portion connecting upper and lower flange portions.

6. The wing according to claim 5, wherein the first roller unit and the second roller unit are arranged in a recess between upper and lower flange portions in a way engaging the engagement surface provided at the upper flange portion and/or at the lower flange portion.

7. The wing according to claim 6, wherein the support beam has such a profile that a first recess is formed between the upper and lower flange portions at a first side of the web portion, and a second recess is formed between the upper and lower flange portions at a second side of the web portion opposite the first side.

8. The wing according to claim 7, wherein the first roller unit comprises a first roller element and a second roller element, wherein the first roller element is arranged in the first recess and the second roller element is arranged in the second recess, wherein the first and second roller elements are arranged coaxially and have the same radius, wherein the second roller unit comprises a third roller element and a fourth roller element, wherein the third roller element is arranged in the first recess and the fourth roller element is arranged in the second recess, and wherein the third and fourth roller elements are arranged coaxially and have the same radius.

9. The wing according to claim 1, wherein the support beam comprises a first beam part and a second beam part that are formed separate from one another, wherein each of the first and second beam parts is formed integrally and extends along the beam longitudinal axis from the rear end to the front end, and wherein the first and second beam parts are mounted to one another and rest against one another along a contact plane spanned by the beam longitudinal axis and a wing thickness direction.

10. The wing according to claim 1, wherein the connection assembly comprises an actuation unit mounted to the main wing and coupled to the flap or to the support element for actuating the flap for movement between the retracted position and the extended position.

11. The wing according to claim 10, wherein the actuation unit comprises a ball screw actuator comprising a nut with an internal thread and a rotatably driven shaft with an external thread engaging the internal thread of the nut, and/or wherein the actuation unit comprises a rotary actuator comprising a rotatably driven arm.

12. The wing according to claim 1, wherein the connection assembly comprises a closing panel covering the support beam from below to the external flow, wherein the closing panel is mounted to the support beam, so that the closing panel pivots between a closed position and an opened position when the support beam is moved between the stowed position and the deployed position.

13. A trailing edge high lift assembly for the wing according to claim 1, the trailing edge high lift assembly comprising:

a flap, and a connection assembly configured for movably connecting the flap to the main wing, such that the flap is movable between a retracted position and at least one extended position, wherein the connection assembly comprises a support element that is mounted to the flap and that is configured for being movably mounted to the main wing, such that the support element is movable relative to the main wing along a predefined path between a stowed position and a deployed position, wherein the support element is formed as an elongate support beam that extends along a beam longitudinal axis between a front end and a rear end and has an intermediate portion between the front and rear ends, the rear end and/or the intermediate portion of the support beam is mounted to the flap, the front end and/or the intermediate portion of the support beam are configured to be mounted to the main wing by a guide bearing, such that the support beam is movable along the predefined path along the beam longitudinal axis between the stowed position and the deployed position.

14. An aircraft comprising the wing according to claim 1.

15. An aircraft comprising the trailing edge high lift assembly according to claim 13.

* * * * *